(12) United States Patent  
Baig et al.

(10) Patent No.: US 12,079,447 B2
(45) Date of Patent: *Sep. 3, 2024

(54) ASSISTIVE SCREENSHOTS

(71) Applicant: GOOGLE LLC, Mountain View, CA (US)

(72) Inventors: Haroon Baig, Mountain View, CA (US); Holger-Frederik Flier, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/547,922

(22) Filed: Dec. 10, 2021

(65) Prior Publication Data

US 2022/0100335 A1  Mar. 31, 2022

Related U.S. Application Data

(63) Continuation of application No. 16/331,229, filed as application No. PCT/US2017/013731 on Jan. 17, 2017, now Pat. No. 11,249,616.

(51) Int. Cl.
*G06F 3/0482* (2013.01)
*G06F 3/0484* (2022.01)
(Continued)

(52) U.S. Cl.
CPC .......... *G06F 3/0482* (2013.01); *G06F 3/0484* (2013.01); *G06F 9/445* (2013.01);
(Continued)

(58) Field of Classification Search
CPC ...... G06F 3/0482; G06F 3/0484; G06F 9/445; G06F 9/451; G06F 9/543; G06F 16/29; G06F 16/9537
See application file for complete search history.

(56) References Cited

U.S. PATENT DOCUMENTS

2002/0188672 A1* 12/2002 Janssen .................. H04L 67/75
                                                          709/203
2011/0199313 A1   8/2011 Tsai
(Continued)

FOREIGN PATENT DOCUMENTS

CN        102156667 A    8/2011
CN        102171940 A    8/2011
(Continued)

OTHER PUBLICATIONS

Search Report and Written Opinion in PCT/US2017/013731 dated Oct. 16, 2017, 10 pages.

(Continued)

*Primary Examiner* — K C Chen
(74) *Attorney, Agent, or Firm* — MARSHALL, GERSTEIN & BORUN LLP

(57) ABSTRACT

A method is implemented in a computing device having an operating system configured to capture screenshot images in response to entries of a pre-defined user input. In the method, an application executes in a current state or mode in which an application screen is shown on the display device, detects an entry of the pre-defined user input by a user, and identifies one or more features that (i) are supported by the application, (ii) are at least partially determined by the current state or mode, and (iii) can use at least one type of information displayed by the application screen to perform respective function(s). The application generates a selectable link for each identified feature, and presents, on the display device, the generated selectable link(s), such that a selection by the user of any one of the generated selectable link(s) causes the application to perform the respective set of functions.

24 Claims, 6 Drawing Sheets

(51) Int. Cl.
  *G06F 9/445* (2018.01)
  *G06F 9/451* (2018.01)
  *G06F 9/54* (2006.01)
  *G06F 16/29* (2019.01)
  *G06F 16/9537* (2019.01)

(52) U.S. Cl.
  CPC .............. *G06F 9/451* (2018.02); *G06F 9/543* (2013.01); *G06F 16/29* (2019.01); *G06F 16/9537* (2019.01)

(56) References Cited

U.S. PATENT DOCUMENTS

| | | |
|---|---|---|
| 2012/0044137 A1 | 2/2012 | Oddiraju et al. |
| 2012/0229842 A1 | 9/2012 | Groves |
| 2014/0223331 A1 | 8/2014 | Sheha et al. |
| 2014/0294257 A1* | 10/2014 | Tussy .................... G06Q 10/00 382/118 |
| 2016/0040996 A1 | 2/2016 | Skillman et al. |
| 2016/0139777 A1 | 5/2016 | Pinho et al. |
| 2016/0283083 A1* | 9/2016 | Fu ........................... G06F 9/451 |
| 2017/0017648 A1 | 1/2017 | Pearlman et al. |
| 2017/0074669 A1 | 3/2017 | Newlin et al. |
| 2017/0212910 A1 | 7/2017 | Morris et al. |

FOREIGN PATENT DOCUMENTS

| | | |
|---|---|---|
| CN | 102968274 A | 3/2013 |
| CN | 103414751 A | 11/2013 |
| CN | 103514581 A | 1/2014 |
| CN | 104461474 A | 3/2015 |
| CN | 105005426 A | 10/2015 |
| EP | 2 728 841 A1 | 5/2014 |
| WO | WO-2010/038985 A2 | 4/2010 |

OTHER PUBLICATIONS

Written Opinion from IPEA in PCT/US2017/013731 dated Nov. 27, 2018, 8 pages.
Examination Report for European Application No. 17702993.1, dated Jul. 26, 2019.

* cited by examiner

ASSISTIVE SCREENSHOTS

CROSS-REFERENCE TO RELATED APPLICATIONS

This is a continuation of U.S. patent application Ser. No. 16/331,229 filed on Mar. 7, 2019 (now U.S. Pat. No. 11,249,616 B2), which is a national stage application under 35 U.S.C. § 371(c) of PCT Patent Application No. PCT/US17/13731, filed on Jan. 17, 2017. The entire disclosure of each of the above-identified applications is hereby incorporated herein by reference.

FIELD OF TECHNOLOGY

The present invention relates to methods, devices and computer programs for generation of one or more links provided on a user interface in response to a trigger event, with the link or links corresponding to a present state or mode of an application running on a computing device. More particularly, the present invention is concerned with the generation of one or more selectable links to different executable features of the application, in real-time upon the entry of a user input corresponding to a screenshot capture.

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Currently available personal computing devices, such as smartphones, PDAs, etc., often include functionality for capturing an image of a screen that is being displayed on a display screen of the computing device. This image is typically referred to as a "screenshot." A user may obtain/capture a screenshot by entering a pre-defined input (e.g., a combination and/or sequence of physical keys) that is recognized by the computing device operating system (OS), and that is generally not dependent upon whether any particular application is, or has been, executed on the computing device. The computing device OS causes the captured screenshot image to be stored in a memory of the computing device, which allows the user to later retrieve the screenshot for various purposes. For example, a user might capture a screenshot of a particular website or application screen with the intention of transmitting the website or application screen image to one or more different applications or users, using known means of communication such as multimedia messaging service (MMS) messages, instant messenger (IM) messages, email messages, and so on. More generally, users tend to capture such screenshots in order to later access the image information (e.g., to avoid re-searching for the information, or to allow access to the information in the absence of Internet connectivity), or to share the image with other users.

Some existing applications include the functionality of displaying to the user a menu of options each time the user obtains a screenshot while the computing device is executing the application, with the options allowing the user to manipulate or share the screenshot image. However, this technique is limited to manipulating or sharing only the screenshot image that has been captured.

Others have proposed techniques by which an OS of a computing device uses its knowledge of which application is currently executing, along with image and text recognition techniques, to try to "guess at" the context and content of a particular screenshot. Options that are believed to be useful in view of the application and the context/content may then be presented to the user. However, the technique is generally limited to features the application makes available externally via an application programming interface (API). These features may be very limited in scope as compared to the full functionality of a given application. For example, applications that utilize sensitive data (e.g., user locations) may restrict the functions available via an API in order to help protect user privacy. Furthermore, the technique is reliant on provisions and assumptions made by the OS developer. The OS developer may lack knowledge of certain features of a given application, and/or lack knowledge of how commonly various features are used, and therefore may fail to fully leverage current features of the application when attempting to predict a user's intentions in capturing a screenshot while the application is running.

Accordingly, there is a need for providing an improved user interface that enables the user to interact with and/or utilize additional functionality and/or content corresponding to the presently displayed screen, in real-time during execution of an application on a computing device.

SUMMARY

In some implementations described herein, an application executing on a computing device provides one or more selectable options/links to a user when the user attempts to capture a screenshot. At least some of the selectable options correspond to features supported by the application, with the features in turn corresponding to the type of information currently being displayed by the application (e.g., information associated with the current state or mode of the application). If the application is a mapping application displaying a transit route at the time the user attempts to capture the screenshot, for example, the selectable options may include a first option for saving non-image route information (e.g., data representing source location, destination location, and particular roads between the two) for later, offline use, a second option for sharing non-image route information to another user, and/or other options. As another example, if the application displays information about places of interest (e.g., restaurants, bars, museums, etc.) at the time the user attempts to capture the screenshot, a first option may be for saving a currently-displayed place of interest as a "favorite" location, a second option may be for sharing non-image information about the place of interest (e.g., place name, place address, etc.) with another user, and so on. In different implementations, storing and/or maintaining the screenshot image in memory may itself be presented as a selectable option, or the screenshot may be automatically stored and/or maintained in memory (e.g., if the design of the OS results in such images always being stored when the corresponding user input is entered). In some implementations, the application also, or instead, presents information designed to teach the user about the availability and/or use of application features that might be useful given the current state or mode of the application.

In one example embodiment, a method is implemented in a computing device having a display device and an operating system. The operating system is configured to capture screenshot images of screens shown on the display device in response to entries of a pre-defined user input. The method comprises executing an application in a current state or mode, in which an application screen is shown on the display device, and detecting, by the application, an entry of the pre-defined user input, by a user of the computing device. The method also comprises identifying, by the application, one or more features that (i) are supported by the application, (ii) are at least partially determined by the current state or mode of the application, and (iii) can use at least one type of information displayed by the application screen to perform a respective set of one or more functions. The method also comprises generating, by the application, a selectable link for each of the identified features, and presenting, by the application and on the display device, the generated selectable links, such that a selection by the user of any one of the generated selectable links causes the application to perform the respective set of functions.

In another example embodiment, a non-transitory, computer-readable medium stores instructions of an application. The application, when executed by one or more processors of a computing device, causes the computing device to: (1) execute the application in a current state or mode, in which an application screen is shown on a display device; (2) detect an entry of the pre-defined user input, by a user of the computing device; (3) identify one or more features that (i) are supported by the application, (ii) are at least partially determined by the current state or mode of the application, and (iii) can use at least one type of information displayed by the application screen to perform a respective set of one or more functions; (4) generate a selectable link for each of the identified features; and (5) present, on the display device, the generated selectable links, such that a selection by the user of any one of the generated selectable links causes the application to perform the respective set of functions.

DETAILED DESCRIPTION OF THE DRAWINGS

Overview

Figure 1:
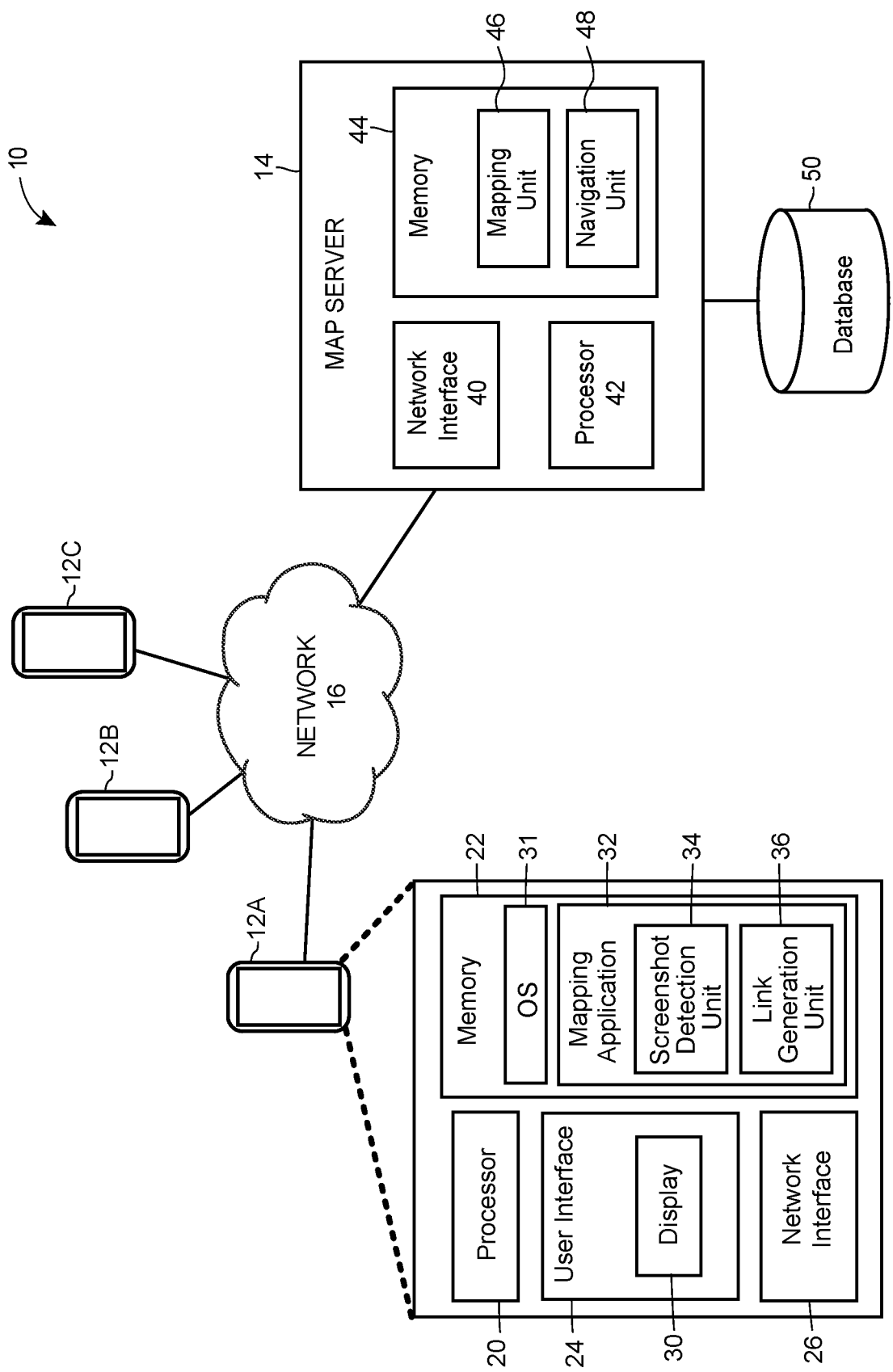
FIG. 1 is a block diagram of an example system in which techniques for increasing utilization and/or awareness of application features may be implemented.

In some implementations described herein, an application executing on a computing device provides a user a set (e.g., menu) of one or more selectable options/links when the user attempts to capture a screenshot during execution of the application (e.g., while a display of the application is being presented to the user). Each of at least some of the selectable options corresponds to one or more features/functions that are supported by the application, and that utilize at least one type of information corresponding to what is shown on the display at the time of the attempted screenshot capture. Thus, the present invention is concerned with presenting the user with options that relate to the current state or mode of an executing application, i.e., the current context of the application.

For instance, if a user obtains a screenshot while using such an application, and the application is currently showing at least a portion of the fastest route between a source point "A" and a destination point "B," an aspect of the present invention may provide the user with selectable links or shortcuts to modules or features within the application that make use of the route and/or source/destination information. This, in turn, may enable the user to proceed more quickly along a path of the application that is associated with the present context. For example, the options provided to the user may include one or more of:

(1) saving non-image data specifying the A-to-B route as a "favorite" route;

(2) sharing non-image data specifying the A-to-B route with one or more other users; and/or (3) sharing updates of the user's progress along the A-to-B route (and/or the user's estimated time of arrival) with one or more other users in real-time.

In this example, the options may be generated based solely on the state or mode of the application at the time of capturing (or attempting to capture) the screenshot. For instance, the application may provide some or all of the options enumerated above in response to detecting a screenshot capture while the application is in a particular navigation or transit mode (e.g., while the application is displaying a transit route after a source and destination have been entered or selected by the user).

As another example, if a screenshot capture (or the action of triggering the screenshot) occurs when the user is viewing a particular place of interest (e.g., a tourist attraction or a restaurant) using a mapping or other application, the options provided to the user may include one or more of:

(1) saving the displayed place of interest as a "favorite" location, or other location type;

(2) sharing non-image data specifying the displayed place of interest with one or more other users; and/or (3) calculating and displaying the fastest route (and/or fastest public transport, etc.) from the current location of the computing device to the displayed place of interest.

As is evident from the above examples, the list of possible options/links to display when a screenshot is taken generally includes options/links that correspond specifically to features of the particular application being executed, and to the present context (state or mode) of that application. Therefore, the invention has advantages over the existing techniques, described in the Background section above, that only allow the use or manipulation (i.e., storing, sharing, or editing) of a screenshot image, irrespective of the types of information contained within that image.

Moreover, the present invention has advantages over other existing techniques (also described in the Background section above) by not relying on the computing device operating system (OS) to interpret or guess at the meaning of the information being shown by a particular application when a screenshot capture is attempted, and by not relying on the limited set of features (if any) that are externally provided by the application via an application programming interface (API), and not relying on the limited set of features (if any) that are known to the OS.

The present invention thus provides an improved, efficient interactive interface for enabling a user to navigate more quickly and easily to one or more features of an executing application, based upon an attempted screen shot capture and in real-time. By providing options that are based on the current context of the application presenting the information captured in a screenshot, the present invention may also improve the accessibility and usability of application features. Further, by avoiding the need for image and/or text recognition capabilities (and related processing) to determine which options may be relevant to a user for a given screenshot, the present invention may reduce the need for processing resources and/or reduce processing time.

Example System

FIG. 1 illustrates an example system 10 in which techniques for increasing utilization and/or awareness of application features may be implemented. The example system 10 includes computing devices 12 (each of which corresponds to a respective user), a map server 14, and a network 16. Map server 14 is remote from each of computing devices 12, and is communicatively coupled to computing devices 12 via network 16. Network 16 may include any suitable combination of wired and/or wireless communication networks, such as one or more local area networks (LANs), metropolitan area networks (MANs), and/or wide area network (WANs). As just one specific example, network 16 may include a cellular network, the Internet, and a server-side LAN. In some implementations, the portion(s) of network 16 used by one of computing devices 12 (e.g., computing device 12A) to communicate with map server 14 may be wholly or partially separate from and independent of the portion(s) of network 16 used by another of computing devices 12 (e.g., computing device 12B) to communicate with map server 14. It is understood, however, that in some implementations and/or scenarios, computing devices 12 do not require connectivity (Internet or otherwise) with map server 14 in order to implement the present invention.

While shown in FIG. 1 as having a smartphone form factor, each of computing devices 12 may be any mobile, portable, fixed location, or semi-fixed location computing device with wired and/or wireless communication capability (e.g., a smartphone, a tablet computer, a laptop computer, a desktop computer, a wearable device such as smart glasses or a smart watch, a vehicle head unit computer, etc.). In other implementations, the components and functionality of one or more of computing devices 12 are distributed among two or more devices, such as a smartphone and a smart watch of the target person.

In the example implementation of FIG. 1, computing device 12A includes a processor 20, a memory 22, a user interface 24, and a network interface 26. Processor 20 may be a single processor (e.g., a central processing unit (CPU)), or may include a set of processors (e.g., multiple CPUs, or a CPU and a graphics processing unit (GPU), etc.).

Memory 22 is a computer-readable storage unit or device, or collection of units/devices, that may include persistent (e.g., hard disk and/or solid state) and/or non-persistent memory components. Memory 22 stores instructions that are executable on processor 20 to perform various operations, including the instructions of various software applications. Memory 22 may also store the data that is generated and/or used by such applications.

User interface 24 includes hardware, firmware and/or software configured to enable a user to interact with (i.e., both provide inputs to and perceive outputs of) the computing device 12A, including at least a display 30 for providing visual outputs. Display 30 may be a touchscreen with both display and manual input (touch sensing) capabilities, or user interface 24 may include a separate mechanism for accepting user inputs (e.g., a keyboard and/or microphone, with associated processing components). Display 30 may include hardware, firmware and/or software conforming to any suitable type of display technology (e.g., LCD, LED, OLED, etc.).

Network interface 26 includes hardware, firmware and/or software configured to enable computing device 12A to wirelessly exchange electronic data with map server 14 via network 16. For example, network interface 26 may include a cellular communication transceiver, a WiFi transceiver, and/or transceivers for one or more other wireless communication technologies.

In the example implementation of FIG. 1, memory 22 stores at least an OS 31 and a mapping application 32. OS 31 may include the instructions of any suitable operating system, such as an Android or iOS, for example. OS 31 includes instructions that define which input can be entered by a user to capture screenshot images. This user "input" may be vendor-specific, and may be the entry of a single physical or virtual key, for example, or the entry of any suitable combination and/or sequence of physical or virtual keys. In some implementations (e.g., certain implementations where computing device 12A is a wearable device), the user input may be a voice command or series of commands. The user input is generally not dependent on what application(s), if any, is/are currently executing on computing device 12A. OS 31 may also include instructions that cause screenshot images to be generated and saved to memory (e.g., a part of memory 22, or another suitable memory) when the pre-defined user input is detected. In some implementations, OS 31 exposes an API function that applications can invoke in order to determine when an entry of the pre-defined user input has occurred. In other implementations, OS 31 does not support such a function.

A mapping application 32 is stored in memory 22. Generally, mapping application 32 is executed by processor 20 to provide the user with one or more user interface screens (presented on display 30) that enable the user to access the services provided by map server 14. For example, mapping application 32 may enable a user to enter or select an address, cause network interface 26 to transmit the address to map server 14, receive responsive map data (e.g., map tile data, map element labels, point of interest images, etc.) from map server 14 via network interface 26, and cause display 30 to present a digital map to the user based on the received map data. As another example, if mapping application 32 includes navigation features, mapping application 32 may enable a user to enter or select source and destination addresses, cause network interface 26 to transmit the addresses to map server 14, receive responsive route/direction data from map server 14 via network interface 26, and cause display 30 to present the corresponding route (e.g., on a digital map and/or in text) to the user.

Mapping application 32 may also enable the user of computing device 12A to obtain other, related services. For example, mapping application 32 may enable users to determine a best/fastest mode of public transit between a source and destination that were entered or selected by the user, and/or enable users to obtain information (e.g., user reviews) about particular places of interest. Moreover, computing device 12A may also include other units not shown in FIG. 1, such as a GPS unit to assist in the positioning of computing device 12A.

While being executed, mapping application 32 can be in one of a number of different modes and/or states at any given time. For example, mapping application 32 may have a map mode, a transit route mode, and a places mode. Some or all of the modes may also be associated with a number of different states. For example, a first state of mapping application 32 while in a map mode may correspond to a user interface screen in which the user is prompted to enter a physical address (or select "Current Location," etc.), a second state may correspond to a user interface screen in which a map including the entered or selected location is presented to the user, and so on. In some implementations, the states may also depend upon what information, if any, the user has entered on a particular user interface screen. For example, a first state may correspond to a screen in which no physical address has been entered, and a second state may correspond to the same screen after the physical address has been at least partially entered. Generally, the modes and/or states of mapping application 32 are at least partially determinative of the types of information being shown on display 30 at any given time.

Mapping application 32 supports a number of different user-selectable features that may not be critical to basic mapping (or routing, etc.) operations, but expand the functionality of mapping application 32 in potentially useful ways. These features may not always be immediately apparent to the user, and their utilization may require that the user enter certain pre-defined user inputs (defined and recognized by mapping application 32) to progress along respective paths of mapping application 32. A "path" of an application, as used herein, refers to a particular sequence of user selections and/or entries as the user navigates through options of the application, with the starting point of the path being the current mode and/or state of the application.

For example, a feature that enables the user to save a currently displayed/mapped area for later, offline use may require the user to first select a particular menu icon that is displayed on the map, and then select an "Offline Areas" menu item. As another example, a feature that enables the user to share displayed transit route information with another user may require that the user first select a particular menu icon that is displayed along with the route information, and then select a "Share Directions" menu item. Examples of additional features are discussed further below in connection with various implementations of the present invention.

In addition to any other units (not shown in FIG. 1) that support the above types of functions and features of mapping application 32, mapping application 32 includes a screenshot detection unit 34 and a link generation unit 36. As the name suggests, screenshot detection unit 34 is generally configured to detect when a user of computing device 12A has attempted to capture a screenshot image. Depending upon which operating system is used for OS 31, screenshot detection unit 34 may use different techniques to detect a screenshot capture attempt. If OS 31 provides an API function that can be invoked by applications to determine when a screenshot capture is attempted, for example, screenshot detection unit 34 may call the API function to determine whether a new screenshot image file has been saved (or to determine whether a user entered a pre-defined user input, etc., depending upon the precise function of the API function).

In other implementations, OS 31 may not provide such an API function, and/or such an API function may not be invoked by mapping application 32. However, OS 31 may save all screenshot images to a known folder or file location, and/or using a known file naming convention. In one such implementation, screenshot detection unit 34 checks for new files in the known folder/location, and/or for new files that use the known file naming convention. The folder/location and/or naming convention may depend upon the vendor of computing device 12A and/or OS 31.

Screenshot detection unit 34 may implement a background process (e.g., a "service," if OS 31 is an Android operating system) to detect new screenshot capture attempts. For example, API calls (or checks for new screenshot image files) may be conducted periodically, or on another suitable basis, while mapping application 32 executes other functions and/or processes. In other implementations, mapping application 32 may "subscribe" to information using an API function of OS 31, after which OS 31 pushes indications of new screenshot capture attempts to mapping application 32.

Link generation unit 36 is generally configured to identify and generate an appropriate set of one or more links to various features of mapping application 32. The link or links is/are generated when screenshot detection unit 34 signals that a new screenshot capture attempt has been detected. Link generation unit 36 may identify the appropriate link(s) based upon the current mode and/or state of mapping application 32, which in turn dictates the type or types of information currently being displayed (e.g., a digital map of an area, and/or a route description, etc.). In some implementations, each of at least some of the identified and generated links, if selected, corresponds to a particular feature of mapping application 32 that can act upon the displayed information (e.g., a feature that can share with another user a route that is at least partially displayed), or upon related information (e.g., a feature that can share a street address associated with a location displayed only as a marker on a digital map).

In general terms, these links may correspond to different paths associated with the current state or mode of mapping application 32. That is, each of at least some of the links may, if selected, activate a feature that the user could have activated in another way (i.e., by another sequence of entries and/or selections starting from the current state or mode), without having first attempted a screenshot capture. Thus, the act of attempting to capture a screenshot may provide a shortcut to activating particular features, and/or may enable the user to activate the feature(s) even if he or she does not know the sequence or combination of inputs that would activate the feature without having attempted the screenshot. Some specific examples are provided below in connection with FIGS. 2 through 4.

Each of computing devices 12B and 12C may be the same as, or similar to, computing device 12A. While FIG. 1 shows only computing devices 12A through 12C, it is understood that map server 14 may be in communication with any number (e.g., thousands) of computing devices that are similar to one or more of computing devices 12A through 12C.

Map server 14 may be associated with (e.g., owned and/or maintained by) a mapping service provider, and includes a network interface 40, a processor 42, and a memory 44. While referred to herein as a "server," map server 14 may, in some implementations, include multiple co-located or remotely distributed computing devices. Network interface 40 includes hardware, firmware and/or software configured to enable map server 14 to exchange electronic data with computing devices 12 via network 16. For example, network interface 40 may include a wired or wireless router and a modem.

Memory 44 is a computer-readable storage unit or device, or collection of units/devices, that may include persistent (e.g., hard disk and/or solid state) and/or non-persistent memory components. Memory 44 stores instructions of a mapping unit 46 and a navigation unit 48. In some implementations, navigation unit 48 is not included in map server 14. Moreover, in some implementations, map server 14 also includes one or more other units, such as a positioning unit that assists computing devices in self-locating, and/or a unit that collects and provides crowd-sourced user reviews and other information relating to particular places. Alternatively, mapping unit 46 includes these other units, and/or includes navigation unit 48.

Mapping unit 46 is generally configured to provide client devices, such as computing devices 12, with mapping services that are accessible via client device mapping applications, such as mapping application 32. For example, mapping unit 46 may receive via network 16 a location (e.g., physical address or coordinates) that was entered by the user via mapping application 32, retrieve map information (e.g., data indicating roads, water and land areas, place names, etc.) for the geographic area of the entered location and its surroundings from a database 50, and cause network interface 40 to transmit the retrieved map information to computing device 12A via network 16. Database 50 may comprise one or more distinct databases, and may be stored in one or more memories (e.g., memory 44 and/or another memory).

Navigation unit 48 is generally configured to provide navigation services to client devices, such as computing devices 12. For example, navigation unit 48 may receive via network 16, or from mapping unit 46, source and destination locations that were entered by a user of computing device 12A via mapping application 32, generate preferred route information for traveling between the route and destination (e.g., data indicating which roads to take, estimated time of arrival, traffic information for preferred routes, etc., for one or more modes of transit), and cause network interface 40 to transmit data indicative of the preferred route(s) to computing device 12A via network 16.

In some implementations, server 14 and application 32 are not used for mapping services. For example, server 14 and application 32 may be dedicated solely to providing best/fastest modes of public transit, or solely to providing crowd-sourced reviews of particular places (e.g., restaurants), etc.

Different aspects of the operation of system 10 will now be described with reference to examples of various implementations and/or scenarios, as shown in FIGS. 2 through 5. FIGS. 2 through 5 depict various user interface screens presented by display 30 in computing device 12A of FIG. 1, with each screen being generated by processor 20 when executing mapping application 32. In other implementations, however, the screens of FIGS. 2 through 5 may correspond to entirely different implementations and applications (e.g., with application 32 being a transit application for the implementation of FIG. 2, a mapping application for the implementation of FIGS. 3 and 5, and a user review application for the implementation of FIG. 4).

Figure 2:
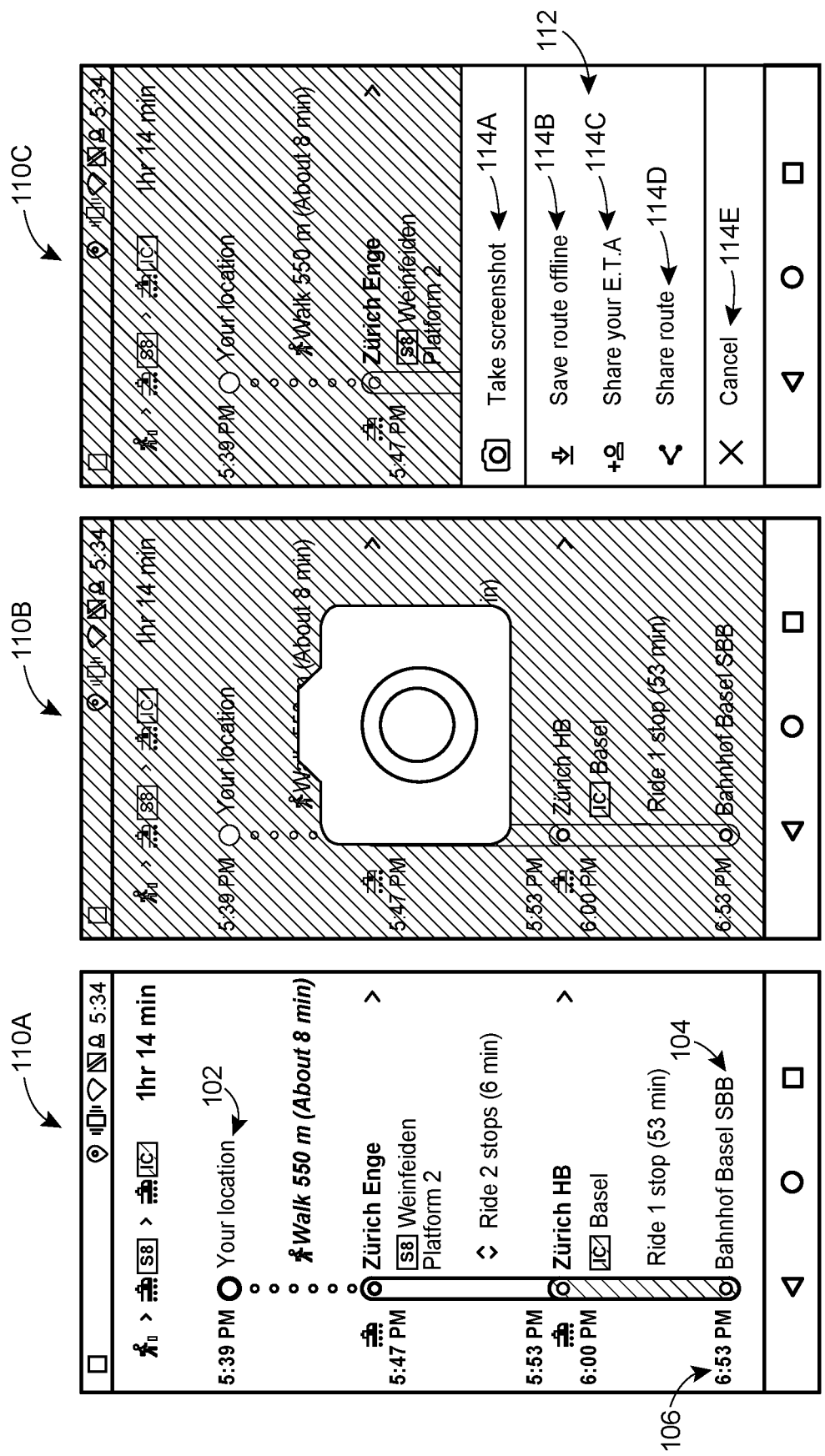
FIG. 2 depicts a display screen before and after a screenshot capture input, according to a first implementation and/or scenario.

Referring first to FIG. 2, display screens 110A through 110C correspond to an implementation in which mapping application 32 provides transit-related services/functionality. Display screen 110A represents the content of display 30 at a time just before the user enters a pre-defined user input that is recognized, by OS 31, as an input for triggering a screenshot capture or capture attempt. As seen in FIG. 2, display screen 110A also corresponds to a mode of mapping application 32 in which a transit route is displayed to the user. Specifically, in the scenario of FIG. 2, display screen 110A presents a route between the user's current location 102 and a destination 104 (here, "Bahnhof Basel SBB"). The displayed route is associated with an estimated time of arrival ("ETA") 106 of 6:53 PM, which is also shown in the upper right corner as a 1 hour and 14 minute time until arrival. As used herein, an ETA may refer to an absolute time (e.g., "6:53 PM" or "18:53") and/or a relative time (e.g., "1 hr 14 min" or "74 min"). As seen in FIG. 2, display screen 110A may also show ETAs for interim transit stops and/or stations on the route, and/or times of departure for certain portions of the route.

Display screen 110B represents the content of display 30 at a slightly later time, just after the user enters the pre-defined user input that is recognized by OS 31 as corresponding to a screenshot capture attempt (e.g., during the brief time period while processor 20 is busy generating the screenshot image and/or performing other processing). Display screen 110C represents the content of display 30 at a still later time, after screenshot detection unit 34 has detected that a screenshot capture has been attempted, and after link generation unit 36 has identified and generated links which are then presented in a pop-up menu 112 as options 114A through 114E.

In the example menu 112, a user selection of option 114A causes the screenshot image to be saved and/or retained in memory. In some implementations, failure to select option 114A causes mapping application 32 to instruct OS 31 (via an API function) to not save the screenshot image, or causes the saved screenshot image to be deleted. In other implementations (e.g., some implementations where screenshot detection unit 34 detects capture attempts by way of checking for new screenshot image files), the screenshot capture automatically occurs and cannot be reversed by mapping application 32, and option 114A is therefore omitted.

Option 114B corresponds to a feature of mapping application 32 that enables the user to save information defining the depicted route for later, offline use (e.g., at a time when no Internet connection is available to the user). This feature may be one that the user could have instead accessed in a different manner, without entering the predefined-user input corresponding to a screenshot capture attempt (e.g., by opening one or more menus and making a number of menu item selections). The route information saved for offline use includes at least some non-image data, and may include different types of data in different implementations. For example, the saved route information may include data indicating the source location, destination location, transit stations/lines, and so forth.

Option 114C corresponds to a feature of mapping application 32 that enables the user to share ETA 106 (or other expression of ETA, such as relative time) with one or more other users, such that the other user(s) receive(s) real-time updates of the ETA as the user associated with computing device 12A moves about. Again, this feature may be one that the user could have instead accessed in a different manner, without entering the predefined-user input corresponding to a screenshot capture attempt (e.g., by opening one or more menus and making a number of menu item selections). The shared information includes at least some non-image data, and may include different types of data in different implementations. For example, the shared ETA information may include ETA 106 and/or a relative time equivalent thereof (e.g., "1 hr 14 min"), and possibly other information (e.g., destination, current location of the user, etc.).

Option 114D corresponds to a feature of mapping application 32 that enables the user to share information defining the (at least partially) depicted route with one or more other users. Once again, this feature may be one that the user could have instead accessed in a different manner, without entering the predefined-user input corresponding to a screenshot capture attempt (e.g., by opening one or more menus and making a number of menu item selections). The shared route information includes at least some non-image data, and may include different types of data in different implementations. For example, the shared route information may include data indicating the source location, destination location, transit stations/lines, and so forth.

A user selection of option 114E causes the menu 112 to disappear, returning the user to display screen 110A without any other action being taken. In other implementations, menu 112 includes additional and/or different options, and/or the options 114 are presented in a different manner.

Figure 3:
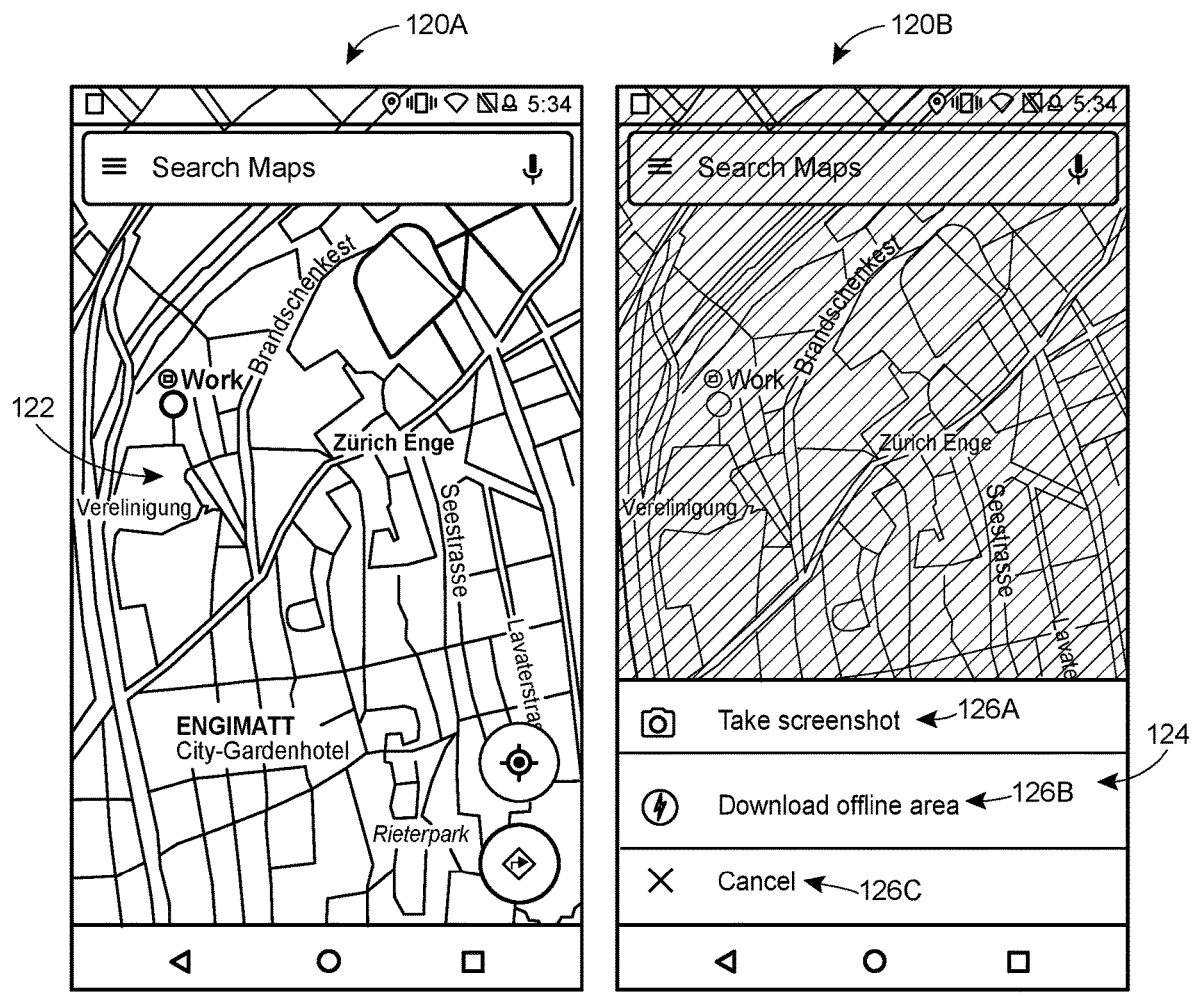
FIG. 3 depicts a display screen before and after a screenshot capture input, according to a second implementation and/or scenario.

Referring next to FIG. 3, display screen 120A represents the content of display 30 at a time just before the user enters a pre-defined user input that is recognized, by OS 31, as an input for triggering a screenshot capture or capture attempt. As seen in FIG. 3, display screen 120A also corresponds to a mode of mapping application 32 in which a digital map 122 is displayed to the user.

Display screen 120B represents the content of display 30 at a slightly later time, after the user enters the pre-defined user input that is recognized by OS 31 as corresponding to a screenshot capture attempt, and after link generation unit 36 has identified and generated links which are then presented in a pop-up menu 124 as options 126A through 126C.

In the example menu 124, a user selection of option 126A causes the screenshot image to be saved and/or retained in memory. Option 126A may be similar to option 114A of FIG. 2, for example. In other implementations (e.g., some implementations where screenshot detection unit 34 detects capture attempts by way of checking for new screenshot image files), the screenshot capture automatically occurs and cannot be reversed by mapping application 32, and option 126A is therefore omitted.

Option 126B corresponds to a feature of mapping application 32 that enables the user to download and save map data for the depicted area (and possibly also other, surrounding areas) for later, offline use (e.g., at a time when no Internet connection is available to the user). As with option 114B of FIG. 2, this feature may be one that the user could have instead accessed in a different manner, without entering the predefined-user input corresponding to a screenshot capture attempt (e.g., by opening one or more menus and making a number of menu item selections). The map data downloaded and saved for later/offline use includes at least some non-image data, and may include different types of data in different implementations (e.g., map tile data, map label data, point of interest image and/or other data, and so forth).

A user selection of option 126C causes the menu 124 to disappear, returning the user to display screen 120A without any other action being taken. In other implementations, menu 124 includes additional and/or different options, and/or the options 126 are presented in a different manner.

Figure 4:
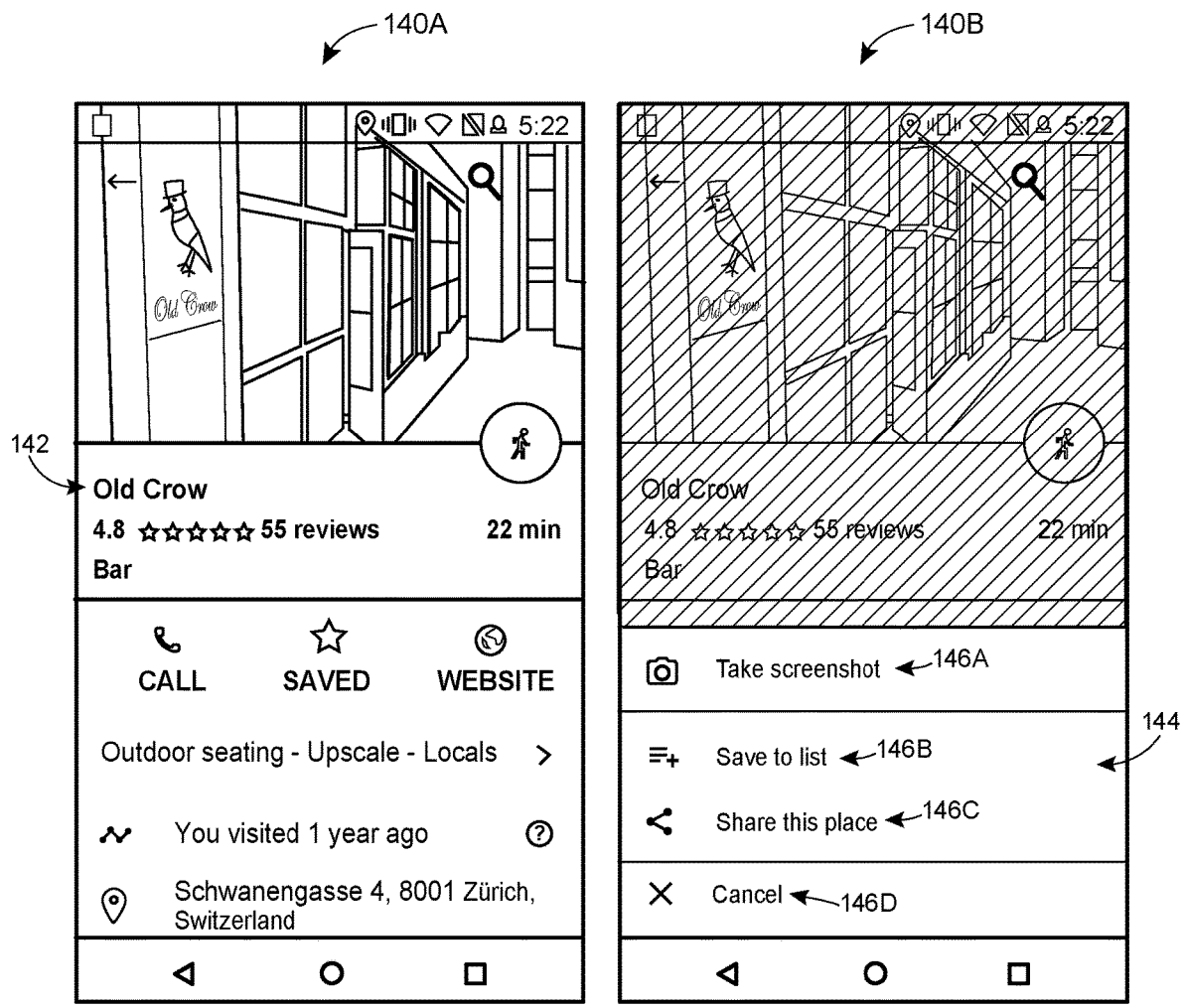
FIG. 4 depicts a display screen before and after a screenshot capture input, according to a third implementation and/or scenario.

Referring next to FIG. 4, display screens 140A and 140B correspond to an implementation in which mapping application 32 provides services/functionality relating to particular places of interest. Display screen 140A represents the content of display 30 at a time just before the user enters a pre-defined user input that is recognized, by OS 31, as an input for triggering a screenshot capture or capture attempt. As seen in FIG. 4, display screen 140A also corresponds to a mode of mapping application 32 in which various types of information about a particular place 142 (here, "Old Crow") are displayed to the user. While FIG. 4 shows information that includes a photograph of the interior of place 142, an average or overall user review of place 142, characteristics or categories of place 142 (e.g., "outdoor seating"), an ETA for arriving at place 142 from the user's current location, and particular other types of information and links, other implementations may include more, fewer, and/or different types of information and/or links.

Display screen 140B represents the content of display 30 at a later time, after the user enters the pre-defined user input that is recognized by OS 31 as corresponding to a screenshot capture attempt, and after link generation unit 36 has identified and generated links which are then presented in a pop-up menu 144 as options 146A through 146D.

In the example menu 144, a user selection of option 146A causes the screenshot image to be saved and/or retained in memory. Option 146A may be similar to option 114A of FIG. 2, for example. In other implementations (e.g., some implementations where screenshot detection unit 34 detects capture attempts by way of checking for new screenshot image files), the screenshot capture automatically occurs and cannot be reversed by mapping application 32, and option 146A is therefore omitted.

Option 146B corresponds to a feature of mapping application 32 that enables the user to save information about place 142 to a list (e.g., to a list of "favorite" places). Again, this feature may be one that the user could have instead accessed in a different manner, without entering the pre-defined-user input corresponding to a screenshot capture attempt (e.g., by opening one or more menus and making a number of menu item selections). The place information saved includes at least some non-image data, and may include different types of data in different implementations (e.g., data indicating the name of place 142, the address of place 142, and so forth).

Option 146C corresponds to a feature of mapping application 32 that enables the user to share information about place 142 with one or more other users. Again, this feature may be one that the user could have instead accessed in a different manner, without entering the predefined-user input corresponding to a screenshot capture attempt (e.g., by opening one or more menus and making a number of menu item selections). The shared place information includes at least some non-image data, and may include different types of data in different implementations. For example, the shared place information may include data indicating the name of place 142, the address of place 142, and so forth.

A user selection of option 146C causes the menu 144 to disappear, returning the user to display screen 140A without any other action being taken. In other implementations, menu 144 includes additional and/or different options, and/or the options 146 are presented in a different manner.

Generally, at least some of the options presented in the menus of FIGS. 2 through 4 (e.g., options 114B through 114D in menu 112, option 126B in menu 124, and options 146A and 146B in menu 144) correspond to actions that a user would likely be hoping to accomplish by capturing a screenshot. With reference to FIG. 2, for example, it is likely that a relatively large percentage of users attempting to capture screenshots of routes (e.g., the route shown on display screen 110A of FIG. 2) are doing so with the intention of having offline and/or easy access to the route information, and/or with the intention of sharing a real-time ETA and/or the route information with others. Thus, options corresponding to those functions/features (options 114B through 114D) are presented in menu 112. As another example, with reference to FIG. 3, it is likely that a relatively large percentage of users attempting to capture screenshots of digital maps (e.g., the map shown on display screen 120A of FIG. 3) are doing so with the intention of having offline access to the map. Thus, an option corresponding to that function/feature (option 126B) is presented in menu 124.

The provision of links/options corresponding to various application features may benefit the user of computing device 12A (and any other user with whom information is shared) in various ways. For example, route, place, or other information may be shared in a manner that is more useful to the receiving user(s) (e.g., by allowing each receiving user to not only view static information about the route/place/ etc., but also save the route/place/etc. as a "favorite" route/ place/etc., or call up a map showing the route/place/etc., and so on). As another example, the links/options may point out to the user of computing device 12A functionality of mapping application 32 of which he or she was previously unaware, or did not know how to access. As yet another example, the links/options may provide a shortcut to various features (e.g., if the user of computing device 12A otherwise would have had to navigate through several screens or menus to get to a desired feature).

Figure 5:
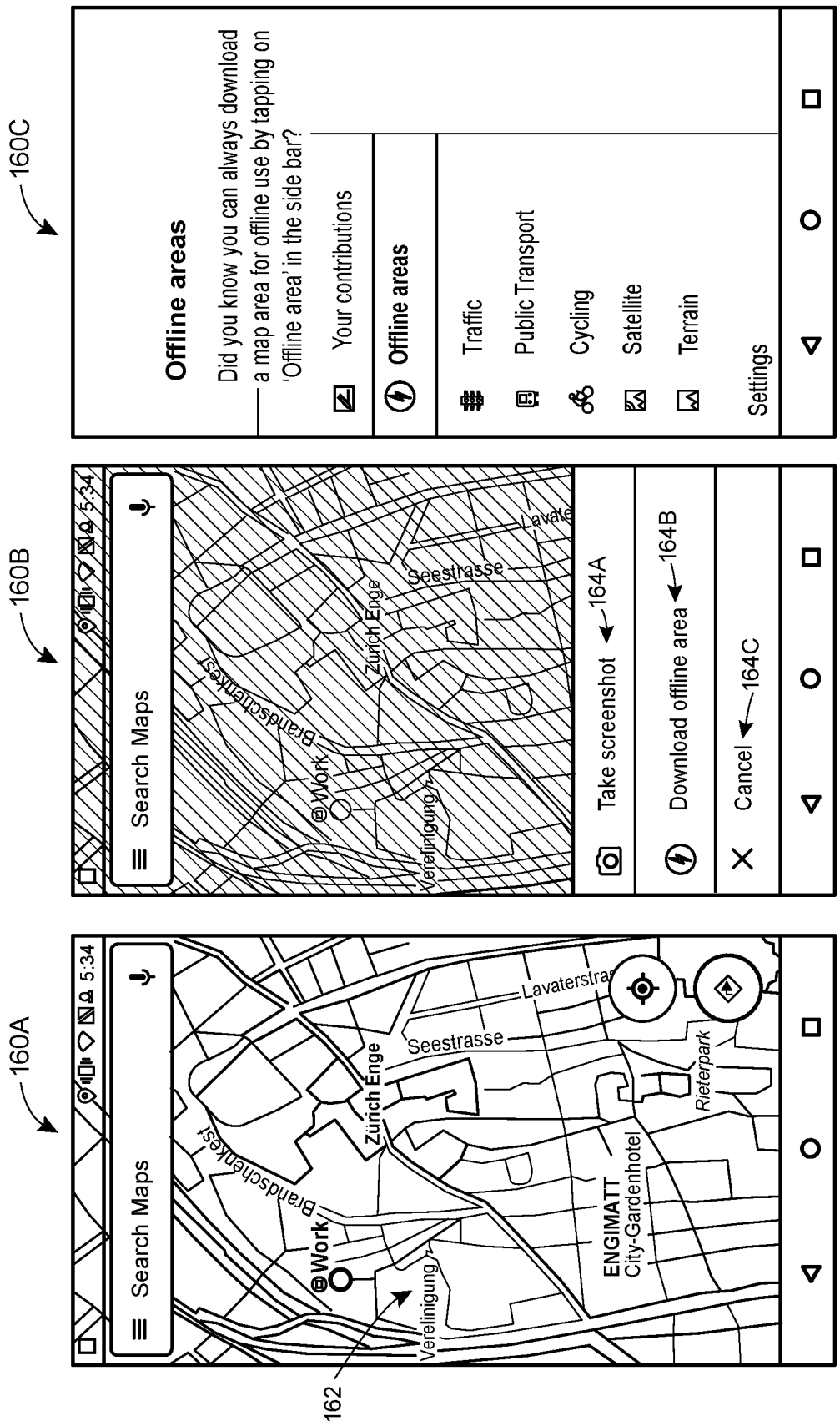
FIG. 5 depicts a display screen before and after a screenshot capture input, according to a fourth implementation and/or scenario.

In some implementations, mapping application 32 instead, or additionally, provides the user of computing device 12A with a tutorial about certain features of mapping application 32 that the user may wish to access. FIG. 5 depicts display screens 160A through 160C corresponding to one such implementation. Display screen 160A (showing a digital map 162) and display screen 160B (showing options 164A through 164C) may be similar to display screens 120A and 120B of FIG. 3. However, whereas the user's selection of option 124B in FIG. 3 activated the feature of mapping application 32 that downloads/saves map data for later, offline use, the user selection of option 164B instead causes display screen 160C to be presented to the user.

As seen in FIG. 5, display screen 160C instructs the user how to download an offline area via the "standard" path (i.e., sequence of inputs/selections starting at the mode or state of screen 160A) for doing so. In some implementations, the download feature is automatically executed when the user selects option 164B (e.g., just before the display screen 160C is shown, or concurrently with showing display screen 160C). In other implementations, display screen 160C is shown without executing the download feature (i.e., the user must follow the instructions shown on display screen 160C to execute the download feature).

Figure 6:
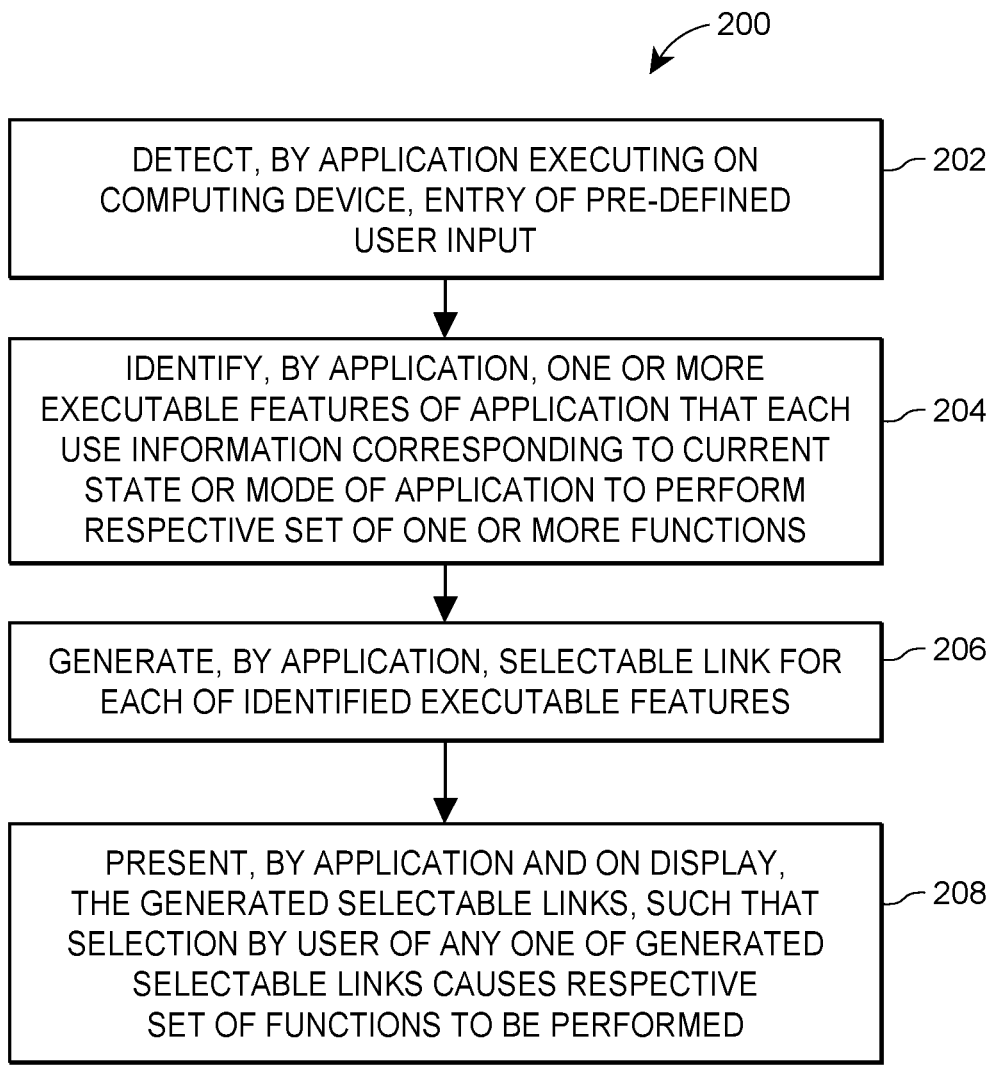
FIG. 6 is a flow diagram of an example method for increasing utilization and/or awareness of application features.

Example Method for Increasing Utilization and/or Awareness of Application Features An example method 200 for increasing utilization and/or awareness of application features is discussed next with reference to FIG. 6. The method 200 may be implemented by one or more processors of a computing device of a user (e.g., by processor 20 of computing device 12A in FIG. 1) when executing instructions of an application stored on a computer-readable medium (e.g., instructions of application 32 stored in memory 22 in FIG. 1).

At block 202, the application detects an entry of a pre-defined user input by the user of the computing device. The pre-defined user input may be an input that is recognized by the OS of the computing device (e.g., OS 31 of FIG. 1) as a trigger for the OS to capture a screenshot image of what is currently shown on a display of the computing device (e.g., on display 30 of FIG. 1). The pre-defined user input may be the entry of a single physical or virtual key, the entry of any suitable combination and/or sequence of physical and/or virtual keys, or another suitable set of one or more inputs (e.g., a voice command).

The application may detect the entry of the pre-defined user input indirectly, particularly in implementations where the pre-defined user input utilizes keys that cannot be customized, and are directly consumed by the OS (e.g., "power+volume down" or "power+home" key combinations). For example, the application may invoke a function of an API of the OS to detect the entry, or may check to see whether a new image has been added to a particular file location (e.g., folder), and/or using a particular naming convention, that is reserved for screenshot images. The application may implement a background process (e.g., a "service" of an Android OS) to check for new screenshot images, either periodically or on another suitable basis.

At block 204, the application identifies one or more executable features of the application that each use information corresponding to a current state or mode of the application to perform a respective set of one or more functions. In some implementations, the application identifies the appropriate application feature(s) by first determining the current state or mode (e.g., by checking a particular data field value). In other implementations, the instructions used to implement block 204 are part of a software module that is only executed when the application is in a particular state or mode, and thus there is no need to explicitly check the current state or mode.

Each of the features identified at block 204 may be one that the application is configured to make available in response to a respective sequence of one or more user inputs being entered starting when the application is in the current state or mode. In one example, if the current state or mode is a state or mode that presents a geographical area on the display (in a digital map), the identified features may include a feature that downloads and/or saves non-image map data corresponding to the geographic area (e.g., the displayed area only, and/or surrounding areas) for later, offline access by the user.

As another example, if the current state or mode is a state or mode that presents a transit route on the display, the identified features may include a feature that saves non-image data specifying the transit route (e.g., source location, destination location, transit station/stop names, etc.) for later access by the user, a feature that shares with one or more other users the non-image data specifying the transit route, and/or a feature that shares with one or more other users, over a period of time, real-time information concerning progress of the user along the transit route (e.g., an ETA that is updated in substantially real-time).

As yet another example, if the current state or mode is a state or mode that presents information concerning a place indicated on the display (e.g., by a label or other marker), the identified features may include a feature that saves non-image data specifying the place (e.g., place name, place address, etc.) for later access by the user (e.g., saving the place to a "favorite" place list), a feature that shares with one or more other users the non-image data specifying the place, a feature that identifies and displays a route to the place from a location of the computing device, and/or a feature that identifies and displays a type of public transport that the user can use to reach the place from a location of the computing device.

At block 206, the application generates a selectable link for each of the executable features identified at block 204. For example, the application may generate a number of displayable objects that each provide a direct link to the respective feature when selected (e.g., via a mouse click or finger tap).

At block 208, the application presents, on the display, the selectable links generated at block 206. The links are presented in such a manner that a selection by the user of any one of the generated selectable links causes the respective set of functions to be performed (e.g., by the application, and/or by other software modules in communication with the application, etc.). Block 208 may include causing the display to show the generated selectable links in a menu list, for example. Each set of functions includes the operations needed to fulfill the purpose of the respective feature (e.g., packaging data, storing data, transmitting data, etc.).

Example Aspects of the Invention

Although the foregoing text sets forth a detailed description of numerous different aspects and embodiments of the invention, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

Aspect 1—A method, implemented in a computing device having a display and an operating system, wherein the operating system is configured to capture screenshot images of screens shown on the display in response to entries of a pre-defined user input, and wherein the method comprises: detecting, by an application executing on the computing device, an entry of the pre-defined user input by a user of the computing device; identifying, by the application, one or more executable features of the application that each use information corresponding to a current state or mode of the application to perform a respective set of one or more functions; generating, by the application, a selectable link for each of the identified executable features; and presenting, by the application and on the display, the generated selectable links, such that a selection by the user of any one of the generated selectable links causes the respective set of functions to be performed.

Aspect 2—The method of aspect 1, wherein detecting an entry of the pre-defined user input includes: determining, by a background process of the application, that a new screenshot image has been stored in a memory of the computing device.

Aspect 3—The method of aspect 1, wherein detecting an entry of the pre-defined user input includes: utilizing, by a background process of the application, an application programming interface (API) of the operating system to determine that the pre-defined user input was entered.

Aspect 4—The method of any one of aspects 1 through 3, wherein the application is configured to make each of the one or more executable features available in response to a respective sequence of one or more user inputs being entered starting when the application is in the current state or mode.

Aspect 5—The method of any one of aspects 1 through 4, wherein the application is a mapping application.

Aspect 6—The method of aspect 5, wherein: the current state or mode of the application is a state or mode that presents a geographic area on the display; and identifying one or more executable features of the application includes identifying a feature of the application that downloads and saves non-image map data corresponding to the geographic area for later, offline access by the user.

Aspect 7—The method of any one of aspects 1 through 6, wherein the current state or mode of the application is a state or mode that presents a transit route on the display.

Aspect 8—The method of aspect 7, wherein identifying one or more executable features of the application includes one or both of: identifying a feature of the application that saves non-image data specifying the transit route for later access by the user; and identifying a feature of the application that shares, with one or more other users, non-image data specifying the transit route.

Aspect 9—The method of aspect 7 or 8, wherein identifying one or more executable features of the application includes: identifying a feature of the application that shares, with one or more other users over a period of time, real-time information concerning progress of the user along the transit route.

Aspect 10—The method of any one of aspects 1-9, wherein the current state or mode of the application is a state or mode that presents information concerning a place on the display.

Aspect 11—The method of aspect 10, wherein identifying one or more executable features of the application includes: identifying a feature of the application that saves non-image data specifying the place for later access by the user.

Aspect 12—The method of aspect 10 or 11, wherein identifying one or more executable features of the application includes: identifying a feature of the application that shares, with one or more other users, non-image data specifying the place.

Aspect 13—The method of any one of aspects 10 through 12, wherein identifying one or more executable features of the application includes: identifying a feature of the application that identifies and displays a route to the place from a location of the computing device.

Aspect 14—The method of any one of aspects 10 through 13, wherein identifying one or more executable features of the application includes: identifying a feature of the application that identifies and displays a type of public transport that the user can use to reach the place from a location of the computing device.

Aspect 15—The system of any one of aspects 1 through 14, wherein presenting the generated selectable links includes causing the display to show the generated selectable links in a menu list.

Aspect 16—A computing device comprising: a display; one or more processors; one or more memories storing (i) instructions of an operating system configured to capture screenshot images of screens shown on the display in response to entries of a pre-defined user input, (ii) image data files, and (iii) instructions of an application, wherein the instructions of the application, when executed by the one or more processors, cause the computing device to detect an entry of the pre-defined user input by a user of the computing device, identify one or more executable features of the application that each use information corresponding to a current state or mode of the application to perform a respective set of one or more functions, generate a selectable link for each of the identified executable features, and present, on the display, the generated selectable links, such that a selection by the user of any one of the generated selectable links causes the respective set of functions to be performed.

Aspect 17—The computing device of aspect 16, wherein the instructions cause the computing device to detect the entry of the pre-defined user input at least by: determining, by a background process of the application, that a new screenshot image has been stored in the one or more memories; or utilizing, by a background process of the application, an application programming interface (API) of the operating system to determine that the pre-defined user input was entered.

Aspect 18—A non-transitory, computer-readable medium storing instructions of an application that, when executed by one or more processors of a computing device, cause the computing device to: detect an entry of a pre-defined user input by a user of the computing device, wherein an operating system of the computing device is configured to capture screenshot images of screens shown on a display of the computing device in response to entries of the pre-defined user input, and wherein the instructions cause the computing device to detect the entry of the pre-defined user input either (i) by utilizing an application programming interface (API) of the operating system, or (ii) by determining that a new screenshot image has been stored in a memory of the computing device; identify one or more executable features of the application that each use information corresponding to a current state or mode of the application to perform a respective set of one or more functions; generate a selectable link for each of the identified executable features; and present, on the display, the generated selectable links, such that a selection by the user of any one of the generated selectable links causes the respective set of functions to be performed.

Aspect 19—The non-transitory, computer-readable medium of aspect 18, wherein the application is configured to make each of the one or more executable features available in response to a respective sequence of one or more user inputs being entered starting when the application is in the current state or mode.

Aspect 20—The non-transitory, computer-readable medium of aspect 18 or 19, wherein: the instructions of the application cause the computing device to present the generated selectable links at least by causing the display to show the generated selectable links in a menu list.

Other Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Unless specifically stated otherwise, discussions in the present disclosure using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used in the present disclosure any reference to "one implementation" or "an implementation" means that a particular element, feature, structure, or characteristic described in connection with the implementation is included in at least one implementation or embodiment. The appearances of the phrase "in one implementation" in various places in the specification are not necessarily all referring to the same implementation.

As used in the present disclosure, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for increasing utilization and/or awareness of application features through the disclosed principles in the present disclosure. Thus, while particular embodiments and applications have been illustrated and described, it is to be understood that the disclosed embodiments are not limited to the precise construction and components disclosed in the present disclosure. Various modifications, changes and variations, which will be apparent to those skilled in the art, may be made in the arrangement, operation and details of the method and apparatus disclosed in the present disclosure without departing from the spirit and scope defined in the appended claims.

What is claimed is:

1. A method implemented in a computing device having a display device and an operating system, wherein the operating system is configured to capture screenshot images of screens shown on the display device in response to entries of a pre-defined user input, and wherein the method comprises:

executing a user review application in a current state or mode in which an application screen provided by the user review application is shown on the display device, wherein the user review application is configured to provide one or more application screens that enable a user of the computing device to access services provided by a server remote from the computing device;

detecting, by the user review application and while the application screen is shown on the display device, an entry of the pre-defined user input by the user;

identifying, by the user review application, one or more features that (i) are supported by the user review application, (ii) are at least partially determined by the current state or mode of the user review application, and (iii) can use at least one type of information displayed by the application screen to perform a respective set of one or more functions, wherein the user review application is configured to make each of the one or more features available in response to a respective sequence of one or more user inputs being entered;

generating, by the user review application, a selectable link for each of the identified features; and presenting, by the user review application and on the display device, the generated selectable links, such that a selection by the user of any one of the generated selectable links causes the user review application to perform the respective set of functions.

2. The method of claim 1, wherein detecting an entry of the pre-defined user input includes:

determining, by a background process of the user review application, that a new screenshot image has been stored in a memory of the computing device.

3. The method of claim 1, wherein detecting an entry of the pre-defined user input includes:

utilizing, by a background process of the user review application, an application programming interface (API) of the operating system to determine that the pre-defined user input was entered.

4. The method of claim 1, wherein the user review application presents information concerning a place on the display device.

5. The method of claim 4, wherein identifying one or more features includes:

identifying a feature of the user review application that saves non-image data specifying the place for later access by the user.

6. The method of claim 4, wherein identifying one or more features includes:

identifying a feature of the user review application that shares, with one or more other users, non-image data specifying the place.

7. The method of claim 1, wherein presenting the generated selectable links includes causing the display device to show the generated selectable links in a menu list.

8. The method of claim 1, wherein the user review application and the server are configured to provide mapping services to the user.

9. The method of claim 8, wherein:

the user review application, configured to provide the mapping services, presents a geographic area on the display device; and identifying one or more features includes identifying a feature of the user review application, configured to provide the mapping services, that downloads and saves non-image map data corresponding to the geographic area for later, offline access by the user.

10. The method of claim 8, wherein identifying one or more features includes:

identifying a feature of the user review application, configured to provide the mapping services, that identifies and displays a route to the place from a location of the computing device.

11. The method of claim 1, wherein the user review application and the server are configured to provide public transit suggestions to the user.

12. The method of claim 11, wherein the user review application, configured to provide the public transit suggestions, presents a transit route on the display device.

13. The method of claim 12, wherein identifying one or more features includes one or both of:

identifying a feature of the user review application, configured to provide the public transit suggestions, that saves non-image data specifying the transit route for later access by the user; and identifying a feature of the user review application, configured to provide the public transit suggestions, that shares, with one or more other users, non-image data specifying the transit route.

14. The method of claim 12, wherein identifying one or more features includes:

identifying a feature of the user review application, configured to provide the public transit suggestions, that shares, with one or more other users over a period of time, real-time information concerning progress of the user along the transit route.

15. The method of claim 11, wherein identifying one or more features includes:

identifying a feature of the user review application, configured to provide the public transit suggestions, that identifies and displays a type of public transport that the user can use to reach the place from a location of the computing device.

16. The method of claim 1, wherein the user review application and the server are configured to provide crowd-sourced reviews to the user.

17. A non-transitory, computer-readable medium storing instructions of a user review application that, when executed by one or more processors of a computing device, cause the computing device to:

execute the user review application in a current state or mode in which an application screen provided by the user review application is shown on a display device, wherein an operating system of the computing device is configured to capture screenshot images of screens shown on a display device in response to entries of a pre-defined user input, and wherein the user review application is configured to provide one or more application screens that enable a user of the computing device to access services provided by a server remote from the computing device;

detect, while the user review application screen is shown on the display device, an entry of the pre-defined user input, by the user;

identify one or more features that (i) are supported by the user review application, (ii) are at least partially determined by the current state or mode of the user review application, and (iii) can use at least one type of information displayed by the application screen to perform a respective set of one or more functions, wherein the user review application is configured to make each of the one or more features available in response to a respective sequence of one or more user inputs being entered;

generate a selectable link for each of the identified features; and present, on the display device, the generated selectable links, such that a selection by the user of any one of the generated selectable links causes the user review application to perform the respective set of functions.

18. The non-transitory, computer-readable medium of claim 17, wherein detecting an entry of the pre-defined user input includes:

determining, by a background process of the user review application, that a new screenshot image has been stored in a memory of the computing device; or utilizing, by a background process of the user review application, an application programming interface (API) of the operating system to determine that the pre-defined user input was entered.

19. The non-transitory, computer-readable medium of claim 17, wherein the user review application and the server are configured to provide mapping services to the user.

20. The non-transitory, computer-readable medium of claim 19, wherein:

the user review application, configured to provide the mapping services, presents a geographic area on the display device; and identifying one or more features includes identifying a feature of the user review application, configured to provide the mapping services, that downloads and saves non-image map data corresponding to the geographic area for later, offline access by the user.

21. The non-transitory, computer-readable medium of claim 17, wherein the user review application and the server are configured to provide public transit suggestions to the user.

22. The non-transitory, computer-readable medium of claim 21, wherein:
   the user review application, configured to provide the public transit suggestions, presents a transit route on the display device; and
   identifying one or more features includes one or both of
   (i) identifying a feature of the user review application, configured to provide the public transit suggestions, that saves non-image data specifying the transit route for later access by the user, and identifying a feature of the user review application that shares, with one or more other users, non-image data specifying the transit route, and
   (ii) identifying a feature of the user review application, configured to provide the public transit suggestions, that shares, with one or more other users over a period of time, real-time information concerning progress of the user along the transit route.

23. The non-transitory, computer-readable medium of claim 17, wherein the user review application and the server are configured to provide crowd-sourced reviews to the user.

24. The non-transitory, computer-readable medium of claim 17, wherein:
   the user review application presents information concerning a place on the display device; and
   identifying one or more features includes one or both of
   (i) identifying a feature of the user review application that saves non-image data specifying the place for later access by the user, or
   (ii) identifying a feature of the user review application that shares, with one or more other users, non-image data specifying the place.

* * * * *